(12) United States Patent
Wagner et al.

(10) Patent No.: US 7,053,772 B2
(45) Date of Patent: May 30, 2006

(54) HUMAN ACTIVITY COORDINATION SYSTEM

(75) Inventors: Thomas A. Wagner, Arlington, VA (US); John A. Phelps, Newport, ME (US); Valerie Guralnik, Orono, MN (US); Ryan A. VanRiper, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 38 days.

(21) Appl. No.: 10/748,093

(22) Filed: Dec. 30, 2003

(65) Prior Publication Data

US 2005/0149366 A1    Jul. 7, 2005

(51) Int. Cl.
*G08B 1/08* (2006.01)
(52) U.S. Cl. .................... 340/539.17; 340/539.11; 340/539.16
(58) Field of Classification Search .......... 340/539.1, 340/539.11, 539.16, 539.17, 539.18, 577, 340/578, 286.07, 539.19; 706/10, 60; 395/50, 395/61

See application file for complete search history.

(56) References Cited

U.S. PATENT DOCUMENTS

| 4,237,344 A | * | 12/1980 | Moore | 379/38 |
| 5,832,187 A | * | 11/1998 | Pedersen et al. | 706/45 |
| 6,289,331 B1 | * | 9/2001 | Pedersen et al. | 706/60 |
| 6,798,343 B1 | * | 9/2004 | Carrier et al. | 340/539.13 |

* cited by examiner

Primary Examiner—Van T. Trieu
(74) Attorney, Agent, or Firm—Kris T. Fredrick

(57) ABSTRACT

A system for coordinating the activity of a plurality of humans in teams with a central automated controller having reasoning capability based on a predetermined set of criteria by sending messages to and from each of the humans. The controller processes input from each of the humans in accordance with programmed decision making capability to accomplish predetermined objectives and provide output to at least some of the humans to assess a situation, direct steps in response thereto and coordinate decisions based on a predetermined model and task assessment reasoning to determine the best way to accomplish the predetermined objectives. The coordinator assesses changes to the situation, and makes decisions about the various tasks to be performed and when they are to be begun. Outputs to the humans may be instructions, questions, information and combinations thereof.

18 Claims, 5 Drawing Sheets

HUMAN ACTIVITY COORDINATION SYSTEM

The Government has rights in this patent application pursuant to Government Contract No. 30602-03-C-0010, awarded by the Department of the Air Force. The present invention relates in general to a system for coordinating human activity and, more particularly, to a system in which a plurality of human performers are given instructions as to who does what and when during dynamic situations.

FIELD OF THE INVENTION

Background of the Invention

Human performers or fielded units must coordinate their activity on the fly to decide who should be doing what and when it is to be done. This is a hard problem for humans when the situation is dynamic or changing, and when the situation is potentially large-scale and time is critical In this post September 11 world, first response teams must act with utmost speed to save as many persons as humanly possible. In other instances, teams of human performers carry out tasks such as rescue operations, searches for missing or abducted persons, evacuate structures and areas under threat of natural disaster as well as human-caused accidents and tragedies.

In the event of a large-scale crisis even such as a terrorist attack, at a large facility like a refinery, petrochemical plant, airport, campus, power plant, major office building or shopping mall effective response requires coordinated action. Teams of responders much act both individually and in concert. Teams may have to support one another. Because the situation is changing in real-time and there is not much information other than alarms before the teams are on-site, an overall control needs to be in place to decide who should be doing what and when. For many units in large scale efforts distributed over a large physical space, this is a very hard problem for humans.

It would be of great advantage if a system could be developed that would permit human performers in a plurality of teams or groups to be able to provide input to a central control section and have network outputs to those same human users.

Another advantage would be achieved if the input from a plurality of teams in a situation would provide location and status information, as well as acknowledging new task assignments.

Still another advantage would be achieved if the output to human users would include input from all of the relevant plurality of teams.

Yet another advantage would be achieved if a simple network of coordination could be developed that took in input and dispensed output in real time, so as to adjust to changing dynamics of the situation of concern.

Other advantages and features will appear hereinafter.

SUMMARY OF THE INVENTION

The present invention provides a system which coordinates human actions using automatic tools to do it In its simplest form, the invention comprises a central automated controller that receives inputs from a plurality of humans, preferably in teams, and dispenses output to those plurality of teams based on a programmed decision making capability. The controller coordinates decisions based on a model and task assessment to use reasoning to determine the best way to accomplish the objectives and, thus, decide who should be doing what and when it should be done.

In one embodiment, each team or each member of each team will have a mobile device such as a radio transmitter/receiver, telephone, wireless PDAs, GPS transmitters/receivers, MEMS and implants, optical transmitters, and the like. In another embodiment, each team or each member of each team will have a laptop or desktop computer or other stationary or vehicle mounted information transmitter and receiver. In both embodiments, the teams of humans have some device or means for sending and receiving data, instructions, questions, and other information. This information is sent by the teams to and from a coordinator such as an incident commander or other central location where the main computing equipment is based. The coordinator reasons about the situation, assesses changes to the situation, and makes decisions about the various tasks to be performed and when they are to be begun.

The present invention permits teams to remain focused on their work without responsibility for choosing. Teams become faster, more efficient, more responsive and, importantly, more flexible. The coordinator reasons based on the known information and the priorities that have been selected, so that changes in the situation are quickly and efficiently factored into the reasoning process.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

Figure 1:
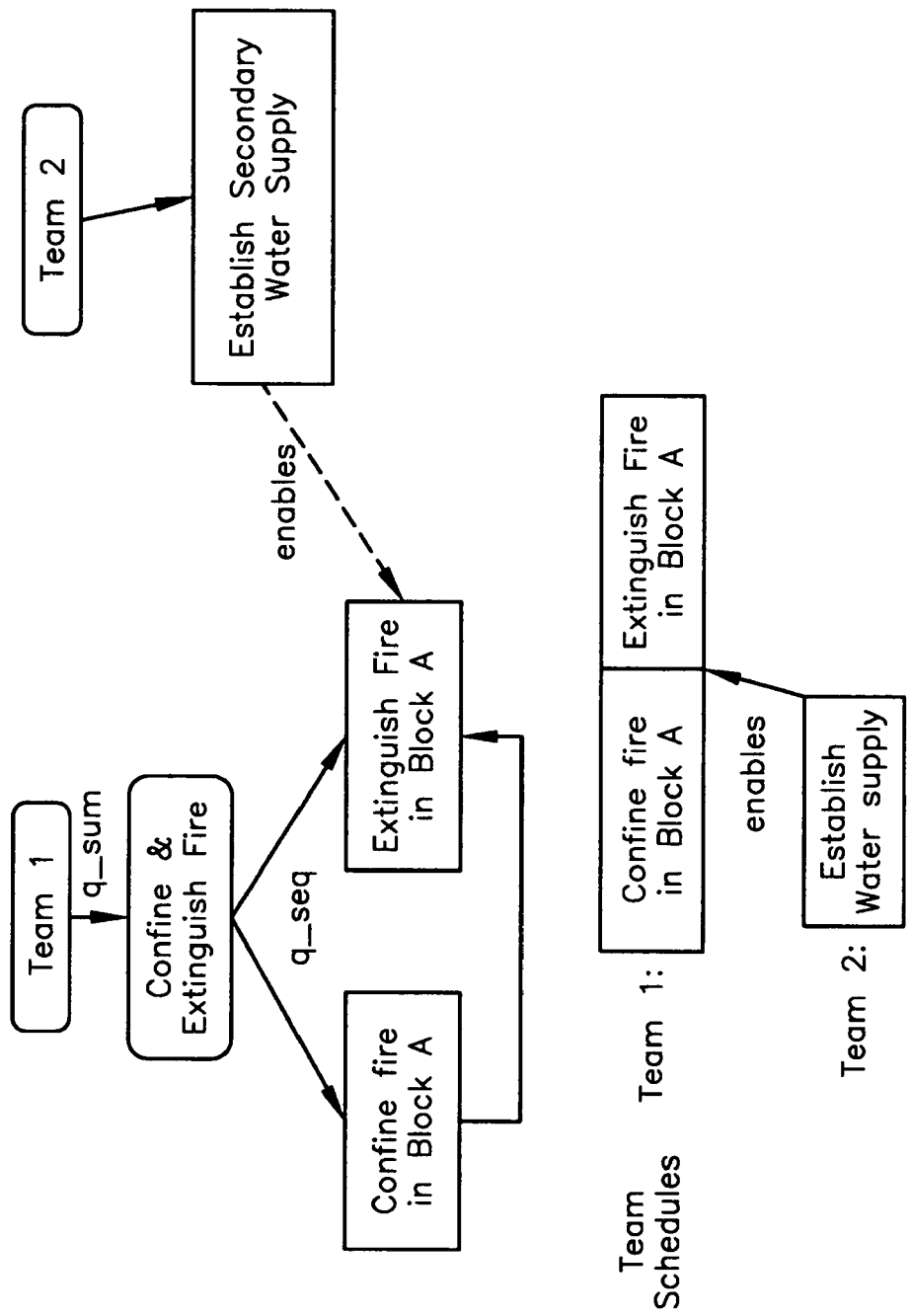
FIG. 1 is a schematic illustration of a simulated reaction operation in which team 1 begins operation and team 2 interacts with team 1.

To demonstrate the efficacy of the present invention, the system of this invention was evaluated in comparison to a traditional approach to a major disaster. In both cases the teams were instructed to enter a large building in a simulation of a crisis event at a large petrochemical plant where on scene reports and fire panels indicated wide-spread and multi-point fires. Four response teams, an incident commander and a mobile command center are deployed. The building has been prepared by placing situation props at various locations, including flat depictions of civilians, fire, smoke and debris. Tools are also placed at the appropriate location, including ladders, nets, ventilation fans stretchers, portable power-saws fire "disposal" and debris "disposal"

which are all depicted by small boxes. Evacuation routes in the form of boxes are also place in the building, showing stairs and windows.

The teams are sent to specific rooms or situation assessment areas where they encounter a sheet detailing the situation description (with some information redundant with props), support and resource needs, and the mission is broken down into sequential tasks. It should be noted that the volunteers are not experts and will not have a response plan for any given situation. Situation alerts are shown at the bottom of the sheets of paper. The teams are instructed to make choices while considering all factors, such as deadlines, timing issues and the assorted risks involved with each choice. Also placed for finding are one or more envelopes marked with specific "open at" times and the teams are instructed to wait for that time at which the envelopes are to be opened. These envelops contain situational information and denote environmental changes or other information that the team members don't know about until a particular time is reached. The props designated civilians, debris, fire, etc., are to be returned to the same location where the props are located. For example, a fire prop is put in a fire extinguishment box and carried to a specific location.

A first exercise comprised four teams who carried walkie-talkies for contact with the incident commander. After the exercise it was determined that the teams generally fared poorly, with chaos and the first responders where quite harried because they had too little time to process temporal data and interactions. Evaluation of the exercise showed that civilians would not have been rescued because of sub optimal choices.

A second exercise took place achieving optimal results using the system of this invention. The teams had hand-held PDFs in this case and communicated input and received output from the reasoning base computer. Team one conducted a search, extinguished a fire while team three provided ventilation in a staircase Then team one continued to search and extinguished a fire while team three brought a stretcher team one needed to evacuate an injured civilian. Team two also searched, extinguished a fire while team four obtained a ladder for a window evacuation. Team two then removed an obstacle and cut a civilian free, then evacuated a group of civilians down a staircase. Team three searched, extinguished another fire and removed an obstacle, then set up fans to evacuate a smoke filled staircase. Team three used a power saw brought to them by team two. Team three used the stretcher and evacuated via the stair case. Team four also searched, extinguished a fire and placed a ladder near a window for team two. The coordinator provided much more than a sequence of steps but instead built an hierarchical process in a way that the human responders were relieved of any responsibility to reason about interactions, resources and deadlines.

The advantages of the system of this invention are many. In the experiments where the team members carried a PDA unit, they signal what they encounter when entering a room, to create a new "mission" to handle the situation found. If they see a fire, they are told by the coordinator to extinguish the fire. If they also encounter civilians, they are told to evacuate them and are given the preferred route, based on information about the site and the data from all the other teams. The coordinator maintains the schedule for each member of each team, telling them when they should perform each scheduled task and when it should be completed. The PDA provides a schedule for the team member, and tasks generated by the system to support other teams are shown in a dialog box on the PDA. When another team has agreed to support one team's activities, a commitment notification appears in the dialog box. The Coordinator also notifies the team members when support for one of its tasks cannot be obtained or if someone who previously agreed to support them can no longer meet their commitment.

Referring to the drawings, the schematic operation of four teams in a simulated disaster in a large building is shown. In FIG. 1, team one enters the building and, when it comes upon a fire in Block A, is instructed to confine and extinguish the fire. One of team 1 reports that the team does not have adequate water, so the coordinator instructs team 2 to provide a secondary water supply. Team 1 then successfully extinguishes the fire in Block A.

Figure 2:
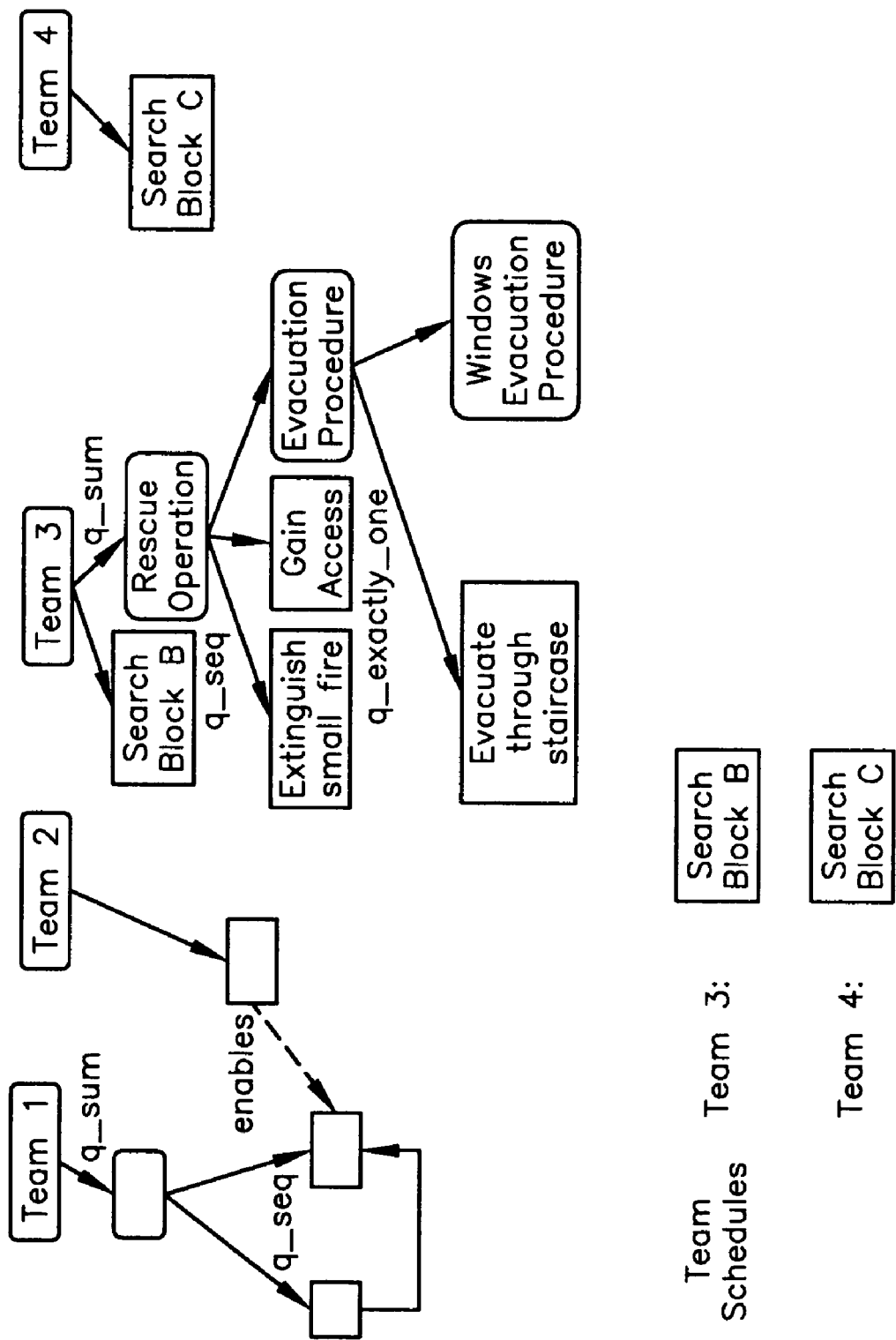
FIG. 2 is a schematic illustration of a simulated reaction operation in which team 3 begins operation and reaches a decision point while team 4 begins its search.

In FIG. 2, team 3 searches Block B, begins a rescue operation and as it reports its findings to the coordinator is instructed to extinguish a small fire and gain access to a location where civilians are trapped. Instead of depending on the reactions and decisions of the team 3 members, the reasoning device of the controller instructs the team 3 humans to provide information so it can evaluate two different evacuation procedures. The team 3 members do not have to make this decision.

Figure 3:
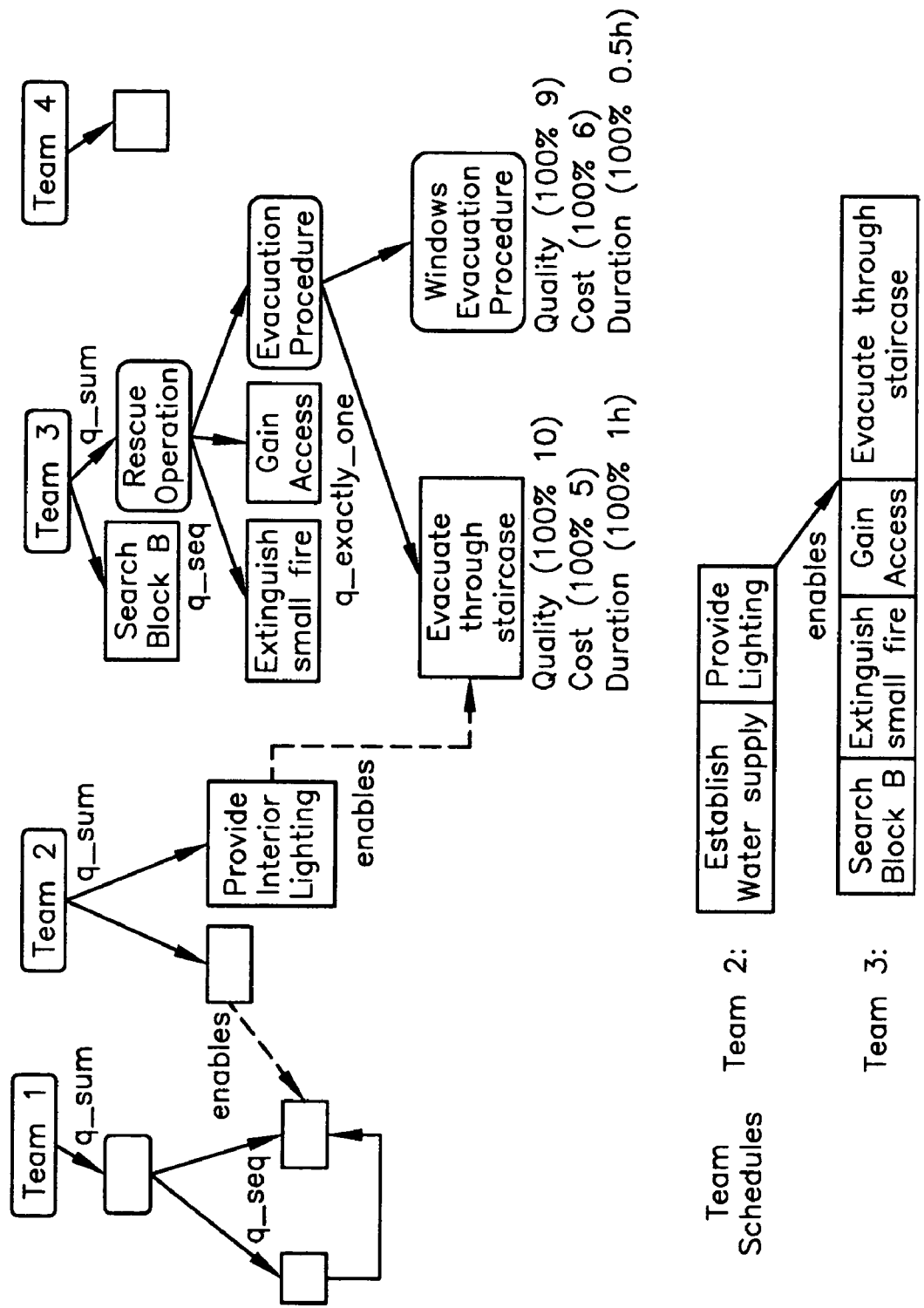
FIG. 3 is a schematic illustration of a simulated reaction operation in which team 2 provides assistance to team 3 and the two options for evacuation are measured.

In FIG. 3, the coordinator instructs members of team 2 to provide interior lighting to the staircase, which team 3 cannot do for itself and would not be able to have team 2 respond nearly as quickly. Team 3 also provides facts that allow the controller to evaluate the two evacuation possibilities and determines that the first option, evacuation through the staircase costs less and is therefore selected, optimizing resources.

Figure 4:
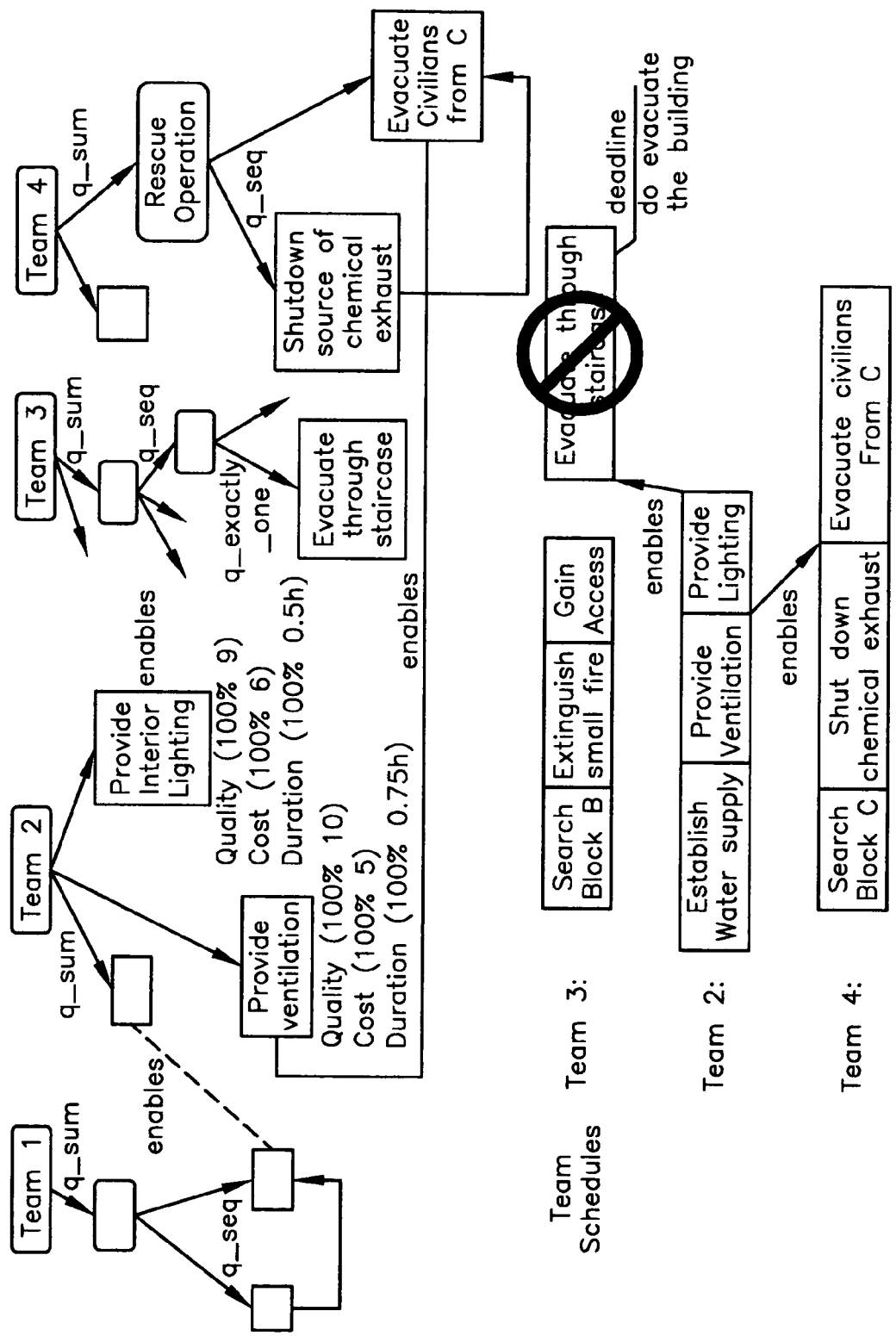
FIG. 4 is a schematic illustration of a simulated reaction operation in which team 4's operation provides information that rules out one of team 3's options.

However, in FIG. 4, the action of team 4, while shutting down a source of chemical exhaust, locates additional civilians in Block C, which is begun when the Controller instructs team 2 to provide ventilation to the room with civilians in Block C. This becomes a priority when the Controller evaluates the entire situation and determines that team 2 will have a different priority and will not be able to assist team 3 in evacuating civilians through the staircase.

Figure 5:
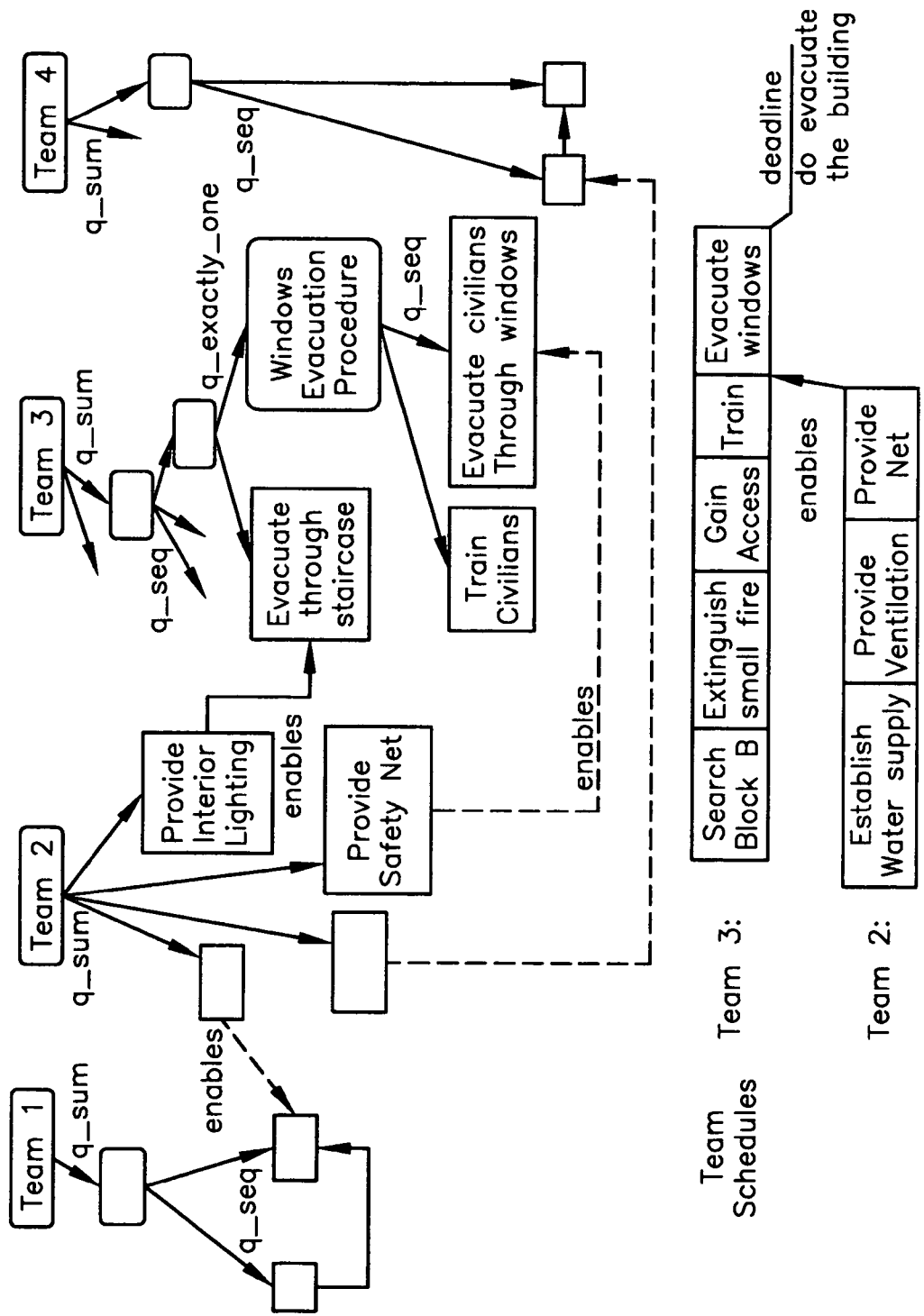
FIG. 5 is a schematic illustration of a simulated reaction operation in which team 2 and team 4 assist team 3 and team 4 completes its task, permitting safe, effective and rapid evacuation of the building.

In FIG. 5 the controller has changed the instructions to teams 2, 3 and 4 such that team 2 provides a safety net while team 3 trains the civilians in use of escape equipment and techniques for evacuation through windows and team 4 brings its civilians out with help also from team 2. The building is evacuated and all civilians are rescued.

The entire simulation took place notably faster. Moving the props did not take up too much time and the responders, doing what they were instructed to do, felt much less pressed, if at all The tests or exercises show that a first responder with coordinators making the response proved to be better, faster, cheaper and had lower risk. It was better because more lives were saved, more responder assets were preserved and more civilian assets were preserved. It was faster because the coordinator responses took less time for response, less time for coordination was required, and much less time was spent making decisions. The exercise was cheaper because the rescue was accomplished with fewer responders and responder assets. The risk was lower to the responders, the civilians, and the assets of both.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

The invention claimed is:

1. A system for coordinating the activity of a plurality of humans in an enclosed facility, comprising:
   a plurality of humans each having a communicator device for communicating information about said activity, said humans being without a response plan for action in said enclosed facility;
   a central automated controller having reasoning capability based on a predetermined set of criteria for said enclosed facility;
   said controller being able to communicate messages to and from each communicator device of each of said humans without requiring decision input from said plurality of humans;
   said controller being able to process input from each of said communicator devices and process said input in accordance with programmed decision making capability to accomplish predetermined objectives and provide output to at least some of said humans through said communicator devices to assess a situation without requiring decision inputs from said plurality of humans and direct steps in response thereto based on a priority determined by said predetermined objectives and the messages from at least some of said communicator device; and
   said controller being adapted to continue receiving inputs, coordinating decisions based on a predetermined model and task assessment reasoning to determine the best way to accomplish the predetermined objectives within said enclosed facility.

2. The system of claim 1, wherein said plurality of humans are formed into a plurality of teams.

3. The system of claim 2, wherein said communicator device of each member of each team is a mobile device selected from the group comprising a radio transmitter/receiver, telephone, wireless PDAs, GPS transmitters/receivers, MEMS and implants, optical transmitters.

4. The system of claim 1, wherein said communicator device of each member of each team is a laptop or desktop computer or other stationary or vehicle mounted information transmitter and receiver.

5. The system of claim 1, wherein the information sent by the teams to and from a coordinator that reasons about the situation, assesses changes to the situation, and makes decisions about the various tasks to be performed and when they are to be begun.

6. The system of claim 1, wherein said programmed decision making capability to accomplish predetermined objectives provides outputs to said communicator device comprising an output selected from the group consisting of instructions, questions, information and combinations thereof.

7. A system for coordinating the activity of a plurality of humans in an enclosed facility, comprising:
   a plurality of humans each having means for communicating over a distance for communicating information about said activity, said humans being without a response plan for action in said enclosed facility;
   a central automated controller means for reasoning based on a predetermined set of criteria for said enclosed facility;
   said controller means being able to communicate messages to and from each means for communicating over a distance of each of said humans without requiring decision inputs from said plurality of humans;
   said controller means being able to process input from each of said means for communicating over a distance and process said input in accordance with programmed decision making capability to accomplish predetermined objectives and provide output to at least some of said humans through said means for communicating over a distance to assess a situation without requiring decision inputs from said plurality of humans and direct steps in response thereto based on a priority determined by said predetermined objectives and the messages from at least some of said communicator device; and
   said controller means being adapted to continue receiving inputs, coordinating decisions based on a predetermined model and task assessment reasoning to determine the best way to accomplish the predetermined objectives within said enclosed facility.

8. The system of claim 7, wherein said plurality of humans are formed into a plurality of teams.

9. The system of claim 8, wherein said means for communicating over a distance of each member of each team is a mobile device selected from the group comprising a radio transmitter/receiver, telephone, wireless PDAs, GPS transmitters/receivers, MEMS and implants, optical transmitters.

10. The system of claim 9, wherein said means for communicating over a distance of each member of each team is a laptop or desktop computer or other stationary or vehicle mounted information transmitter and receiver.

11. The system of claim 7, wherein the information sent by the humans to and from said coordinator means that reasons about the situation, assesses changes to the situation, and makes decisions about the various tasks to be performed and when they are to be begun.

12. The system of claim 7, wherein said programmed decision making capability to accomplish predetermined objectives provides outputs to said means for communicating over a distance comprising an output selected from the group consisting of instructions, questions, information and combinations thereof.

13. A method for coordinating the activity of a plurality of humans in an enclosed facility, comprising the steps of:
   assembling a plurality of humans each having a communicator device for communicating information about said activity, said humans being without a response plan for action in said enclosed facility;
   accessing a central automated controller having reasoning capability based on a predetermined set of criteria for said enclosed facility;
   communicating messages from said controller to and from each communicator device of each of said humans without requiring decision inputs from said plurality of humans;
   processing input from each of said communicator devices and process said input in accordance with programmed decision making capability in said controller to accomplish predetermined objectives and provide output to at least some of said humans through said communicator devices to assess a situation without requiring decision inputs from said plurality of humans and direct steps in response thereto based on a priority determined by said predetermined objectives and the messages from at least some of said communicator device; and
   continuing to receive inputs from said communicators to and outputs from said controller to coordinate decisions based on a predetermined model and task assessment reasoning to determine the best way to accomplish the predetermined objectives within said enclosed facility.

14. The method of claim 13, wherein said plurality of humans are formed into a plurality of teams.

15. The method of claim 14, wherein said communicator device of each member of each team is a mobile device selected from the group comprising a radio transmitter/receiver, telephone, wireless PDAs, GPS transmitters/receivers, MEMS and implants, optical transmitters.

16. The method of claim 14, wherein said communicator device of each member of each team is a laptop or desktop computer or other stationary or vehicle mounted information transmitter and receiver.

17. The method of claim 14, wherein the information sent by the humans to and from said coordinator means that reasons about the situation, assesses changes to the situation, and makes decisions about the various tasks to be performed and when they are to be begun.

18. The method of claim 13, wherein said programmed decision making capability accomplishes said predetermined objectives by providing outputs to said means for said communication device comprising an output selected from the group consisting of instructions, questions, information and combinations thereof.

* * * * *